(12) United States Patent
Sawai et al.

(10) Patent No.: US 11,447,005 B2
(45) Date of Patent: Sep. 20, 2022

(54) HIGH-PRESSURE CONTAINER UNIT

(71) Applicant: TOYOTA JIDOSHA KABUSHIKI KAISHA, Aichi-ken (JP)

(72) Inventors: Osamu Sawai, Okazaki (JP); Tomoki Nakashima, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 239 days.

(21) Appl. No.: 16/695,188

(22) Filed: Nov. 26, 2019

(65) Prior Publication Data

US 2020/0180428 A1    Jun. 11, 2020

(30) Foreign Application Priority Data

Dec. 11, 2018 (JP) .............................. JP2018-231955

(51) Int. Cl.
*B60K 15/03* (2006.01)
*B60K 15/067* (2006.01)
(Continued)

(52) U.S. Cl.
CPC ............ *B60K 15/03* (2013.01); *B60K 15/067* (2013.01); *B60K 15/07* (2013.01); *F17C 13/084* (2013.01); *B60K 2015/03032* (2013.01); *B60K 2015/03105* (2013.01); *B60K 2015/03118* (2013.01); *B60K 2015/03151* (2013.01); *B65D 2501/24222* (2013.01); *F17C 2201/035* (2013.01); *F17C 2205/0169* (2013.01)

(58) Field of Classification Search
CPC ............ F17C 2205/0107; F17C 13/084; F17C 2205/0142; F17C 2201/035; F17C 2205/0169; F17C 1/08; F17C 2203/012; F17C 2205/0103; B60K 15/03; B60K 2015/03032; B60K 2015/03105; B60K 15/067; B60K 15/07; B60K 2015/03118; B60K 2015/03151; B65D 2501/24222
See application file for complete search history.

(56) References Cited

U.S. PATENT DOCUMENTS 5,154,556 A * 10/1992 Wappel ................. F17C 13/084
    410/97
5,673,939 A * 10/1997 Bees ..................... F17C 11/005
    280/831
(Continued)

FOREIGN PATENT DOCUMENTS

CN     102233814 A    11/2011
JP     2004-26088 A    1/2004
(Continued)

*Primary Examiner* — Atif H Chaudry
(74) *Attorney, Agent, or Firm* — Hauptman Ham, LLP (57) ABSTRACT

A high-pressure container unit includes: a box-shaped case mounted on a vehicle and configured to include a bottom portion, a ceiling portion, and a peripheral wall portion; a plurality of container main bodies arranged in an interior of the case and each having a cylindrical body portion; and a reinforcing member extending along an axial direction of the container main body, the reinforcing member being provided in at least one of a space surrounded by the container main bodies adjacent to each other and the bottom portion and, a space surrounded by the container main bodies adjacent to each other and the ceiling portion.

17 Claims, 5 Drawing Sheets

(51) Int. Cl.
B60K 15/07 (2006.01)
F17C 13/08 (2006.01)

(56) References Cited

U.S. PATENT DOCUMENTS

| | | |
|---|---|---|
| 6,257,360 B1 | 7/2001 | Wozniak et al. |
| 2005/0169724 A1 | 8/2005 | Sharp et al. |
| 2006/0032532 A1 | 2/2006 | Suess et al. |
| 2006/0289224 A1 | 12/2006 | Ono et al. |
| 2011/0259933 A1 | 10/2011 | Dossow |
| 2014/0375043 A1* | 12/2014 | Finck .................... B60K 15/07 |
| | | 280/831 |
| 2019/0047411 A1 | 2/2019 | Kataoka et al. |

FOREIGN PATENT DOCUMENTS

| | | |
|---|---|---|
| JP | 2007-39020 A | 2/2007 |
| JP | 2008-49961 A | 3/2008 |
| JP | 2019-33657 A | 2/2019 |

* cited by examiner

HIGH-PRESSURE CONTAINER UNIT

INCORPORATION BY REFERENCE

The disclosure of Japanese Patent Application No. 2018-231955 filed on Dec. 11, 2018 including the specification, drawings and abstract is incorporated herein by reference in its entirety.

BACKGROUND

1. Technical Field

This disclosure relates to a high-pressure container unit.

2. Description of Related Art

Japanese Unexamined Patent Application Publication No. 2008-049961 (JP 2008-049961 A) discloses a structure in which a plurality of high-pressure tanks is disposed in a unit case in which the upper side is open.

SUMMARY

As in JP 2008-049961 A, a plurality of high-pressure tanks is disposed in a case, whereby assembly to a vehicle becomes easy. On the other hand, when a reinforcing member is disposed in the case in order to improve collision resistance performance, it is necessary to reduce the capacity of the high-pressure tank.

This disclosure provides a high-pressure container unit capable of improving collision resistance performance while securing the capacity of a high-pressure container.

An aspect of this disclosure relates to a high-pressure container unit. The high-pressure container unit includes a box-shaped case mounted on a vehicle and configured to include a bottom portion, a ceiling portion, and a peripheral wall portion, a plurality of container main bodies arranged in an interior of the case and each having a cylindrical body portion, and a reinforcing member extending along an axial direction of the container main body, the reinforcing member being provided in at least one of a space surrounded by the container main bodies adjacent to each other and the bottom portion and, a space surrounded by the container main bodies adjacent to each other and the ceiling portion.

The high-pressure container unit according to the aspect includes a box-shaped case that is mounted on the vehicle, and the case is configured to include a bottom portion, a ceiling portion, and a peripheral wall portion. A plurality of container main bodies is arranged in the interior of the case, and each of the container main bodies has a cylindrical body portion. A reinforcing member extends along the axial direction of the container main body. In this way, an external force such as a collision load input to one side in the axial direction of the container main body can be transmitted to the other side in the axial direction, and thus it is possible to improve collision resistance performance.

The reinforcing member is provided in at least one of a space surrounded by the container main bodies adjacent to each other and the bottom portion and a space surrounded by the container main bodies adjacent to each other and the ceiling portion. In this way, it is possible to dispose the reinforcing member without reducing the diameter of the container main body. That is, it is not necessary to reduce the capacity of the container main body.

In the aspect, a gap may be provided between at least one end portion in the axial direction of the container main body and the peripheral wall portion of the case, and both end portions in a longitudinal direction of the reinforcing member may be fixed to the peripheral wall portion.

According to the aspect, both end portions in the longitudinal direction of the reinforcing member are fixed to the peripheral wall portion of the case, and therefore, a load input to the peripheral wall portion to which the one end side of the reinforcing member is fixed can be reliably transmitted to the peripheral wall portion at the other end portion. A gap is provided between at least one end portion in the axial direction of the container main body and the peripheral wall portion, and therefore, it is possible to restrain the container main body from being pinched by the peripheral wall portion of the case.

In the aspect, the reinforcing members may include a lower reinforcing member provided in a space surrounded by the container main bodies adjacent to each other and the bottom portion, and an upper reinforcing member provided in a space surrounded by the container main bodies adjacent to each other and the ceiling portion.

According to the aspect, the collision resistance performance can be further improved compared to a structure in which solely one of the lower reinforcing member and the upper reinforcing member is provided.

The high-pressure container unit according to the aspect may further include a connecting member connecting the lower reinforcing member and the upper reinforcing member in a vertical direction.

According to the aspect, a collision load can be dispersed between the lower reinforcing member and the upper reinforcing member.

In the aspect, the reinforcing member may extend in a vehicle width direction in a state of being mounted on the vehicle.

According to the aspect, in particular, the collision resistance performance at the time of a side collision can be improved.

As described above, with the high-pressure container unit according to this disclosure, it is possible to improve the collision resistance performance while securing the capacity of the high-pressure container.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A high-pressure container unit 10 according to a first embodiment will be described with reference to the drawings. An arrow FR, an arrow UP, and an arrow RH appropriately stated in each drawing respectively indicate a forward direction of a vehicle, an upward direction, and a right side of the vehicle in a state where the high-pressure container unit 10 is mounted on a fuel cell vehicle. Hereinafter, in a case where description is made simply using the front and rear, the top and bottom, and the right and left with regard to a direction, unless otherwise specified, the front and rear, the top and bottom, and the right and left shall indicate the front and rear in a front-rear direction of the vehicle, the top and bottom in an up-down direction of the vehicle, and the right and left in a vehicle width direction in a case of facing in a traveling direction.

Figure 1:
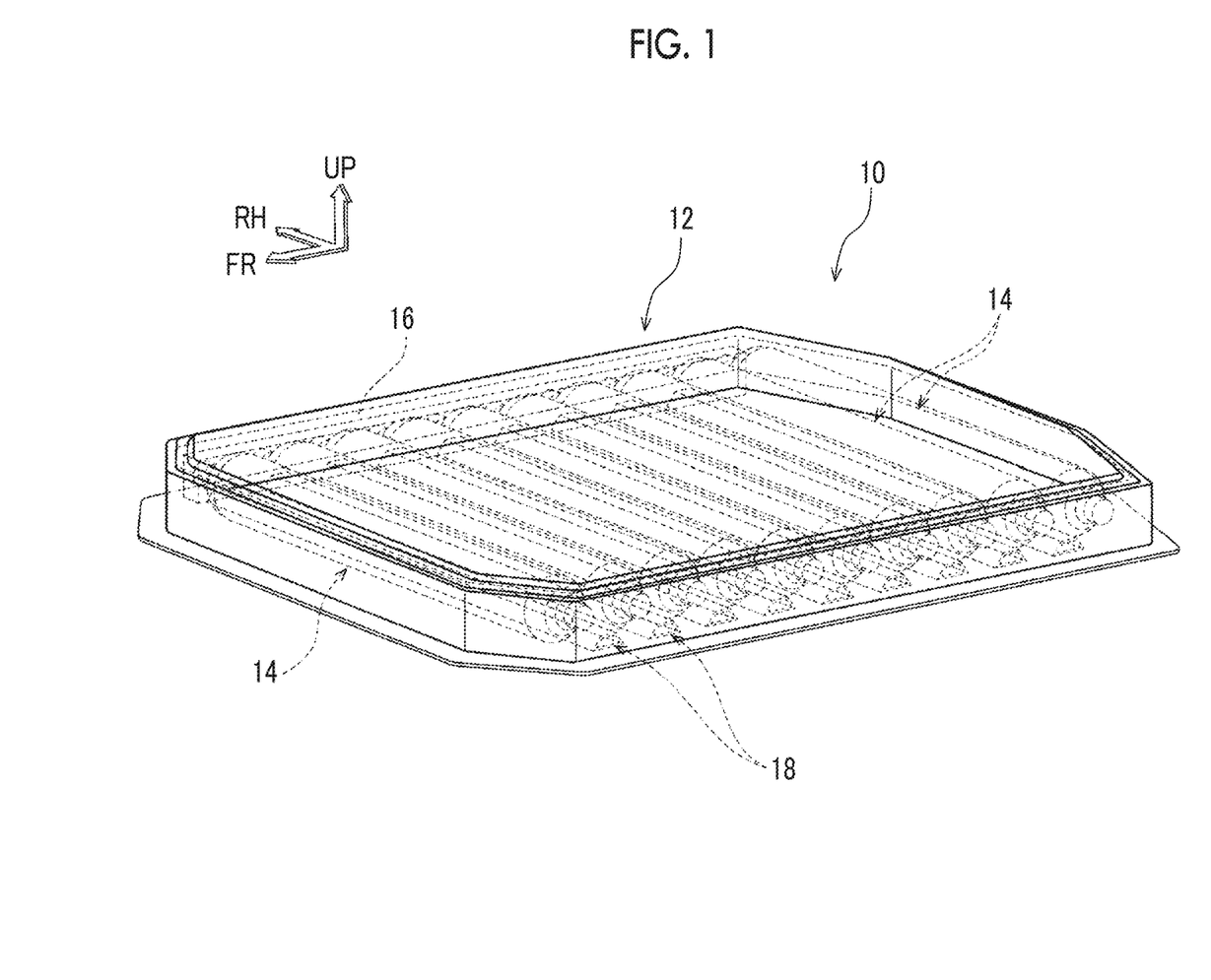
FIG. 1 is a perspective view showing the overall configuration of a high-pressure container unit according to a first embodiment.

As shown in FIG. 1, the high-pressure container unit 10 of this embodiment is disposed on the vehicle lower side of a floor panel configuring a floor surface (not shown) of the vehicle. The high-pressure container unit 10 is configured to include a case 12, a container main body 14, a manifold 16, and a lower reinforcing member 18 as a reinforcing member.

Figure 3:
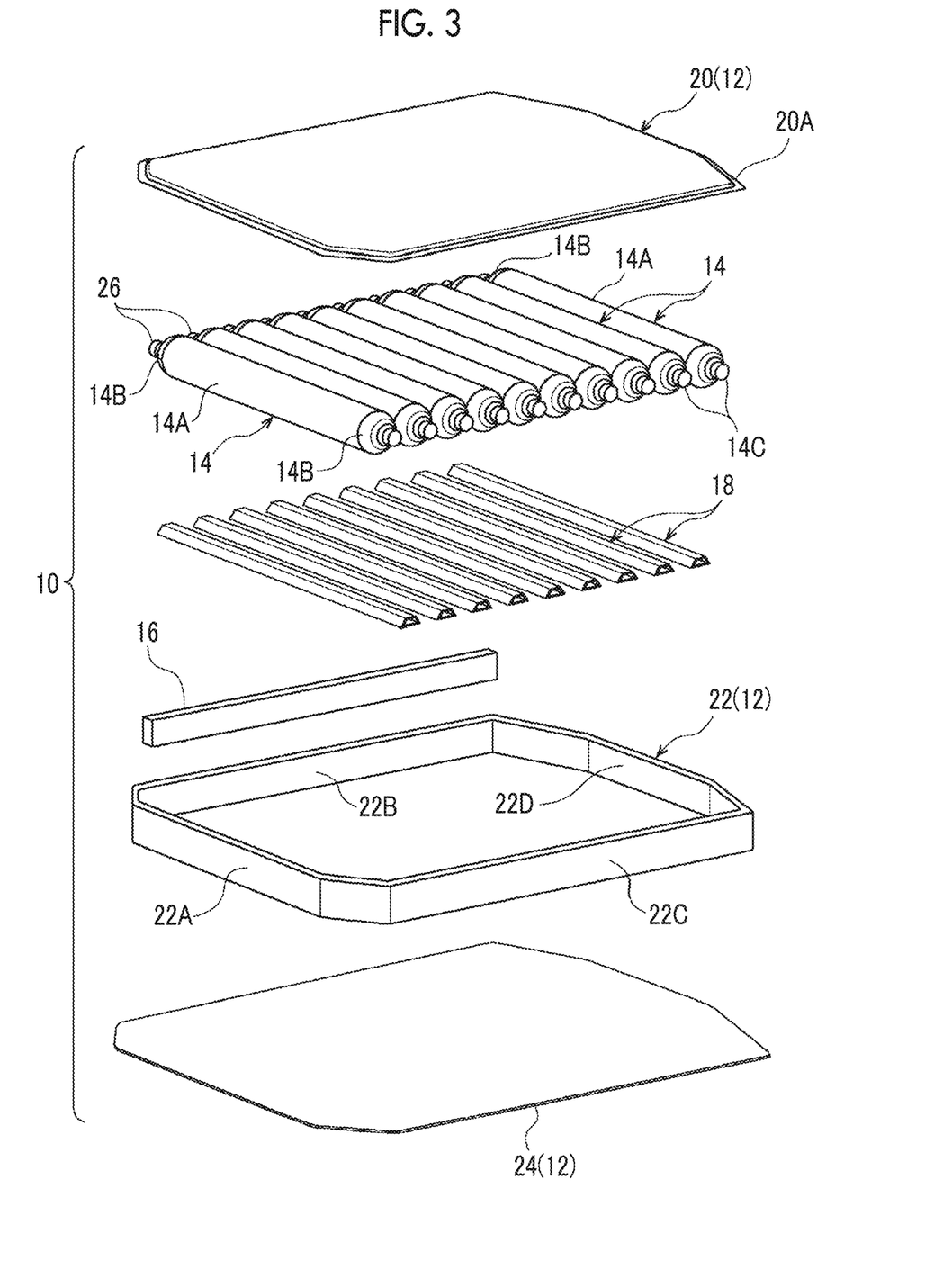
FIG. 3 is an exploded view showing the overall configuration of the high-pressure container unit according to the first embodiment.

As shown in FIG. 3, the case 12 is a metal member formed in a substantially box shape and is configured to include a bottom portion 24, a ceiling portion 20, and a peripheral wall portion 22. The bottom portion 24 is formed in a substantially rectangular shape when viewed in a plan view and is configured with a flat plate member in which a thickness direction thereof is in the up-down direction.

The ceiling portion 20 is provided on the side opposite to the bottom portion 24 with the peripheral wall portion 22 interposed therebetween and is formed in a shape corresponding to the bottom portion 24 when viewed in a plan view. A joining portion 20A is formed at a peripheral end portion of the ceiling portion 20, and the joining portion 20A is formed at a position one step lower than a general portion. Then, the joining portion 20A is joined to the upper end surface of the peripheral wall portion 22, whereby an opening on the upper side of the case 12 is closed.

The peripheral wall portion 22 is provided to be erected on the bottom portion 24, thereby configuring a peripheral wall of the case 12. The peripheral wall portion 22 includes a front wall 22A extending in the vehicle width direction on the vehicle front side, and a right wall 22B extends from a right end portion of the front wall 22A toward the vehicle rear side. A left wall 22C extends from a left end portion of the front wall 22A toward the vehicle rear side, and a rear end of the right wall 22B and a rear end of the left wall 22C are connected to each other by a rear wall 22D extending in the vehicle width direction.

In this embodiment, as an example, each of the front wall 22A, the right wall 22B, the left wall 22C, and the rear wall 22D is formed in a closed cross-sectional shape by extrusion molding or the like. Both end portions in the vehicle width direction of the front wall 22A and both end portions in the vehicle width direction of the rear wall 22D are bent in order to prevent interference with peripheral members.

Figure 2:
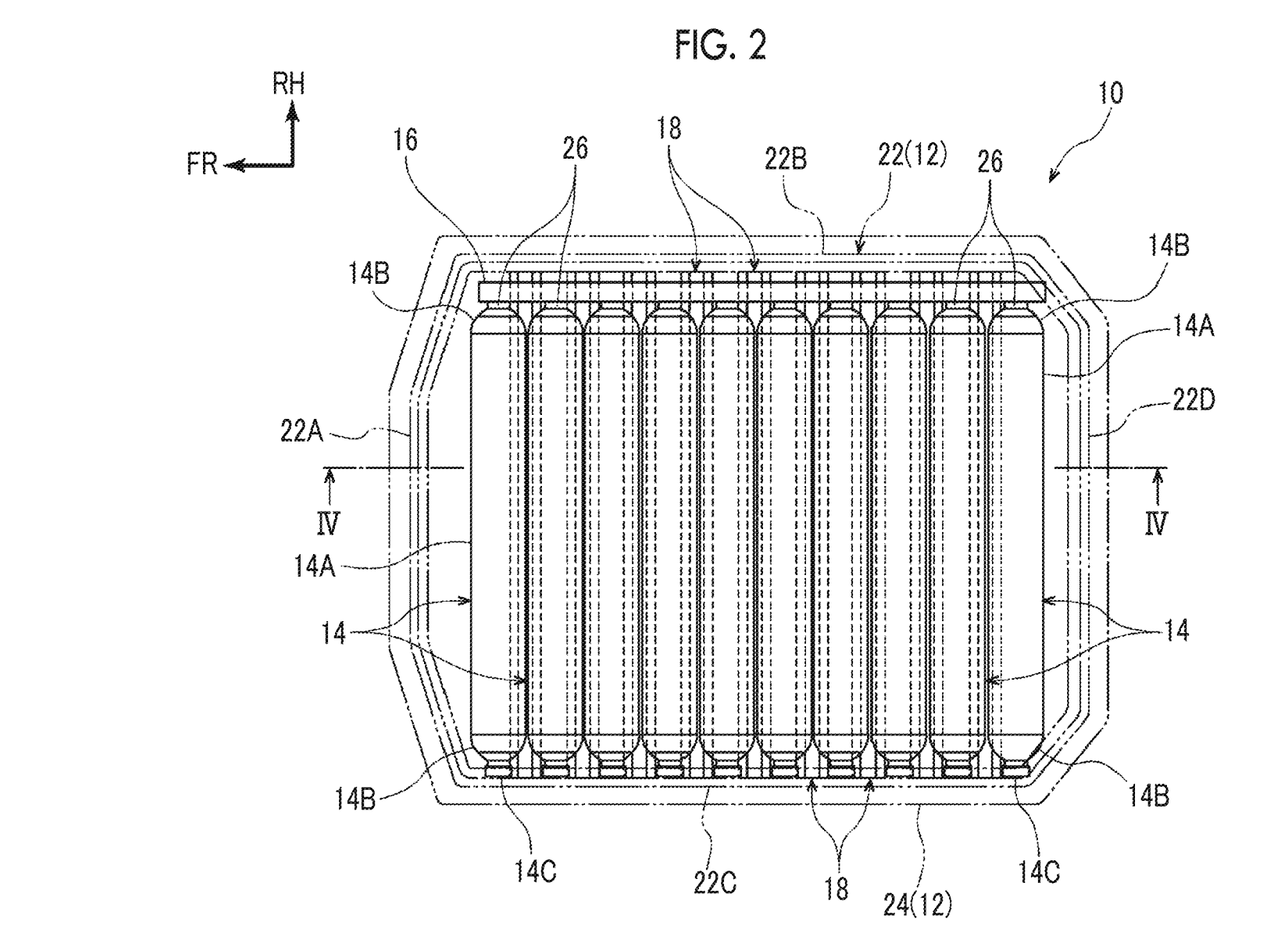
FIG. 2 is a plan view showing the overall configuration of the high-pressure container unit according to the first embodiment.

As shown in FIGS. 1 and 2, a plurality of container main bodies 14 is arranged in the interior of the case 12, and in this embodiment, as an example, ten container main bodies 14 are arranged in the front-rear direction of the vehicle.

Each of the container main bodies 14 is provided with a substantially cylindrical body portion 14A in which an axial direction thereof is in the vehicle width direction. The body portion 14A extends in the vehicle width direction with a constant diameter in the axial direction, and hemispherical dome portions 14B are integrally formed at both end portions in the axial direction (vehicle width direction) of the body portion 14A. In this embodiment, as an example, the container main body 14 is formed mainly of an aluminum alloy. However, there is no limitation thereto, and the container main body 14 may be formed mainly of resin.

A cap 26 is mounted to the dome portion 14B on the right side of the vehicle in the container main body 14. Then, the cap 26 is assembled to the manifold 16. The manifold 16 extends in the front-rear direction of the vehicle, and a flow path communicating with an internal space of each of the container main bodies 14 is formed in the interior of the manifold 16. In this way, the internal spaces of all the container main bodies 14 communicate with each other by the manifold 16, and the ten container main bodies 14 are configured to function as a single high-pressure container. A valve (not shown) is mounted to the manifold 16, and a high-pressure gas filled in the interior of the container main body 14 can be replenished and supplied through the valve.

On the other hand, the dome portion 14B on the left side of the vehicle in the container main body 14 is fixed to the left wall 22C of the peripheral wall portion 22 of the case 12. Specifically, a mounting portion 14C extends from the dome portion 14B on the vehicle left side of the container main body 14 toward the left side of the vehicle, and the mounting portion 14C is mounted to a mounted portion (not shown) provided at the left wall 22C.

In this manner, a gap is provided between one end portion (an end portion on the vehicle right side) in the axial direction of the container main body 14 and the right wall 22B (the peripheral wall portion 22) of the case 12, and a gap is not provided between the other end portion (an end portion on the vehicle left side) in the axial direction of the container main body 14 and the left wall 22C (the peripheral wall portion 22) of the case 12. That is, the end portion on the vehicle left side of the container main body 14 is fixed to the case 12 so as not to move, and in the state of being fixed to the case 12, a slight gap is provided between the container main bodies 14 adjacent to each other, as shown in FIG. 4.

Here, the lower reinforcing member 18 made of metal is provided in a space surrounded by the container main bodies 14 adjacent to each other and the bottom portion 24 of the case 12. As shown in FIG. 3, a plurality of lower reinforcing members 18 is provided and arranged in the front-rear direction of the vehicle. Each of the lower reinforcing members 18 extends with a longitudinal direction thereof being in the vehicle width direction. In other words, the lower reinforcing member 18 extends along the axial direction of the container main body 14.

Figure 4:
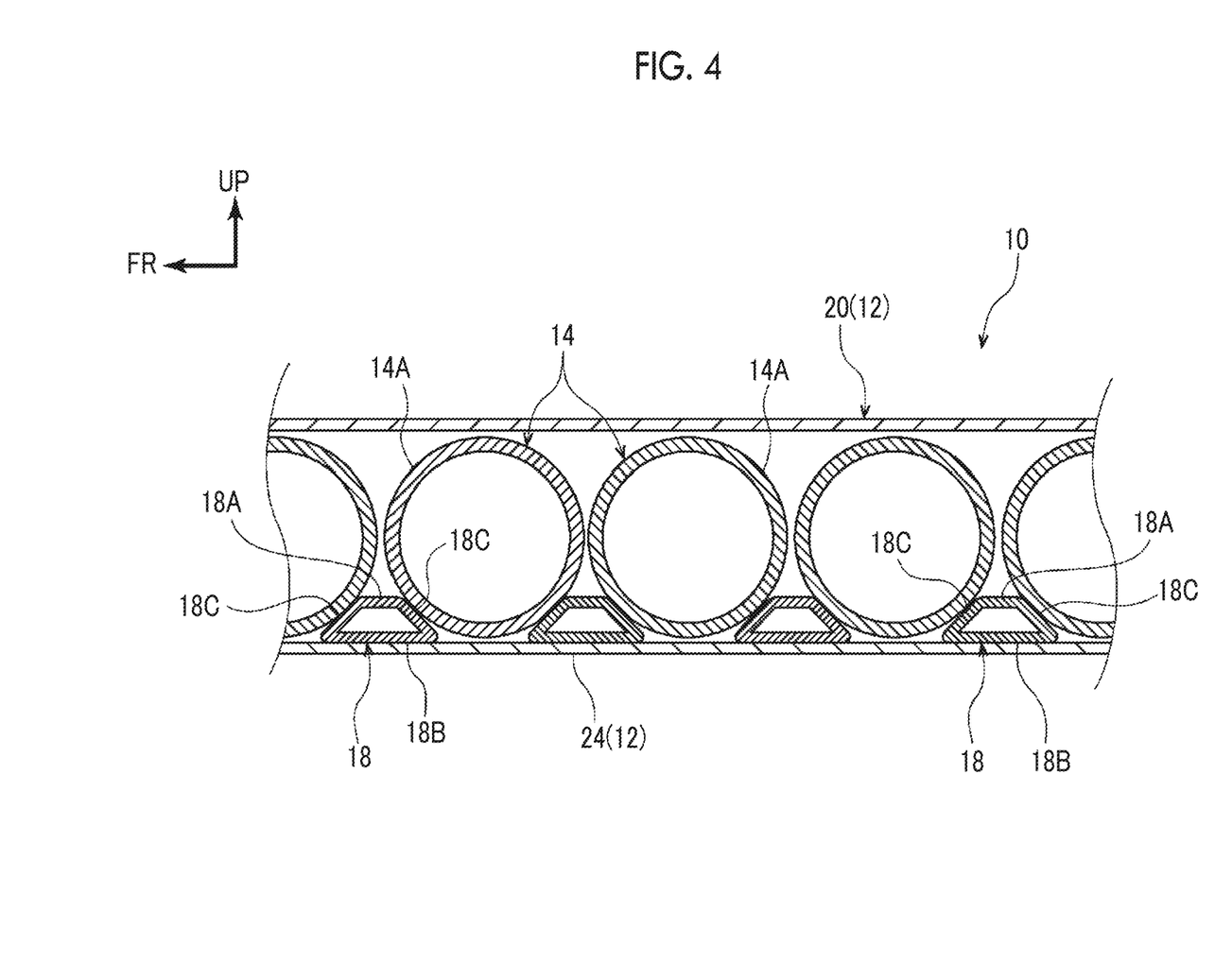
FIG. 4 is an enlarged sectional view of a main part showing a state of being cut along line IV-IV of FIG. 2 in an enlarged manner.

As shown in FIG. 4, the lower reinforcing member 18 is formed such that a cross section as viewed in the vehicle width direction has a substantially trapezoidal shape, and is configured in a closed cross-sectional shape including an upper surface portion 18A, a lower surface portion 18B, and a side surface portion 18C. The lower surface portion 18B is formed longer than the upper surface portion 18A in the front-rear direction of the vehicle and is superimposed on the bottom portion 24 of the case 12. Then, the lower surface portion 18B of the lower reinforcing member 18 is fixed to the bottom portion 24. The side surface portion 18C of the lower reinforcing member 18 is slightly curved so as to correspond to the circumferential surface of the container main body 14 and is in contact with the container main body 14.

Here, as shown in FIG. 2, one end portion of the lower reinforcing member 18 is fixed to the right wall 22B configuring the peripheral wall portion 22, and the other end portion of the lower reinforcing member 18 is fixed to the left wall 22C configuring the peripheral wall portion 22.

Operation

Next, an operation of this embodiment will be described.

In the high-pressure container unit 10 according to this embodiment, the plurality of container main bodies 14 is arranged in the interior of the case 12, and the lower reinforcing member 18 extends along the axial direction of the container main body 14. In this way, it is possible to reinforce the container main body 14. An external force such as a collision load input to one side in the axial direction of the container main body 14 can be transmitted to the other side in the axial direction, and thus it is possible to improve the collision resistance performance.

As shown in FIG. 4, the lower reinforcing member 18 is provided in the space surrounded by the container main bodies 14 adjacent to each other and the bottom portion 24. In this way, it is possible to dispose the lower reinforcing member 18 without reducing the diameter of the container main body 14. That is, since a dead space is utilized, it is not necessary to reduce the capacity of the container main body 14. As a result, it is possible to improve the collision resistance performance while securing the capacity of the container main body 14.

In particular, in this embodiment, as shown in FIG. 2, the lower reinforcing member 18 extends in the vehicle width direction. In this way, at the time of a side collision, a collision load input to one side in the vehicle width direction can be effectively transmitted to the other end side in the vehicle width direction by the lower reinforcing member 18, and thus it is possible to improve the collision resistance performance at the time of the side collision.

In this embodiment, both end portions in the longitudinal direction of the lower reinforcing member 18 are respectively fixed to the right wall 22B and the left wall 22C of the peripheral wall portion 22. In this way, it is possible to reliably transmit the collision load to the anti-collision side, compared to a configuration in which the length of the lower reinforcing member 18 is shorter than the length between the right wall 22B and the left wall 22C.

On the other hand, a gap is provided between the container main body 14 and the right wall 22B. In this way, before the collision load is transmitted to the container main body 14, the collision load can be received by the lower reinforcing member 18. That is, the container main body 14 can be restrained from being pinched between the right wall 22B and the left wall 22C of the peripheral wall portion 22. As a result, it is possible to improve the collision resistance performance.

Second Embodiment

Next, a high-pressure container unit 50 according to a second embodiment will be described. The same configurations as those in the first embodiment are denoted by the same reference numerals, and description thereof is appropriately omitted.

Figure 5:
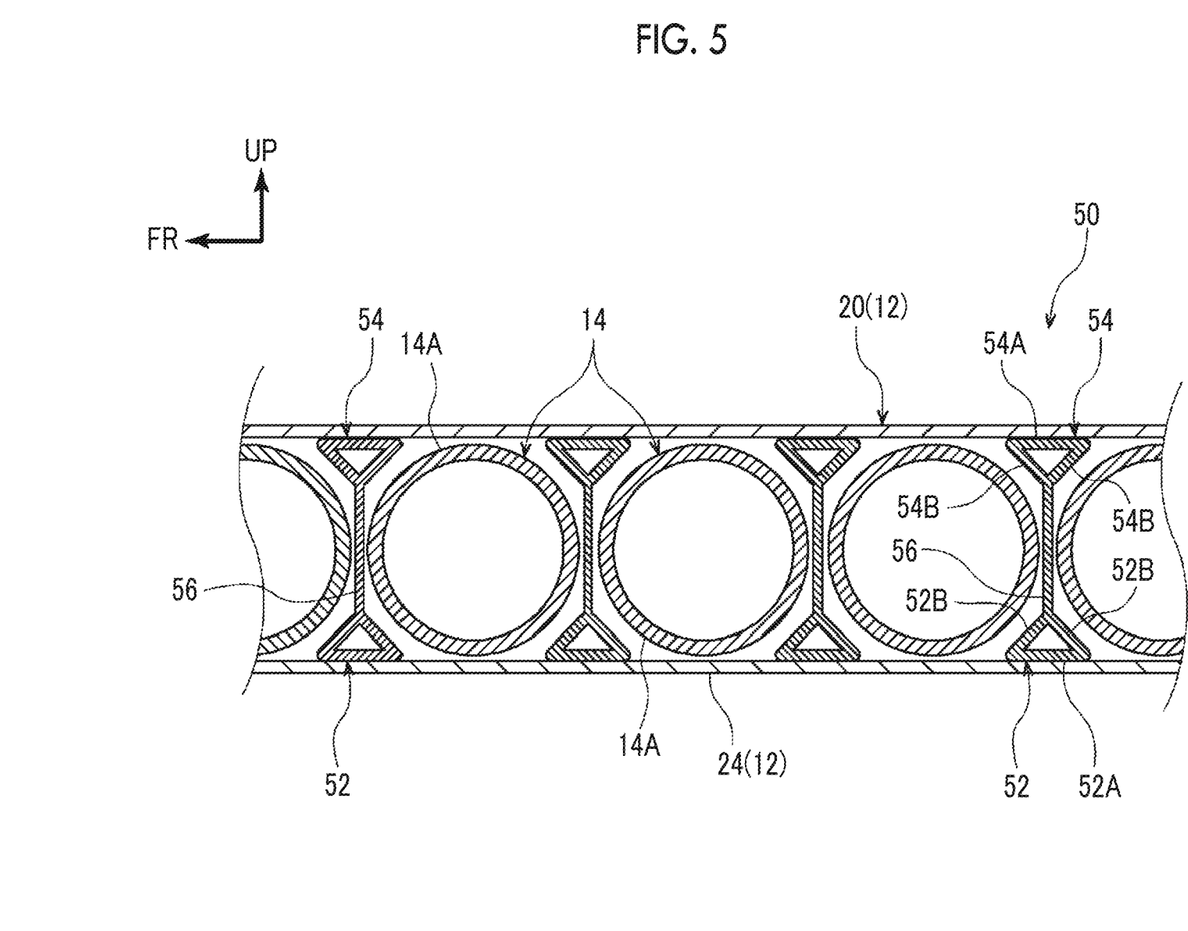
FIG. 5 is an enlarged sectional view corresponding to FIG. 4, showing a main part of a high-pressure container unit according to a second embodiment in an enlarged manner.

As shown in FIG. 5, in the high-pressure container unit 50 of this embodiment, a lower reinforcing member 52 is provided in a space surrounded by the container main bodies 14 adjacent to each other and the bottom portion 24 of the case 12. On the other hand, an upper reinforcing member 54 is provided in a space surrounded by the container main bodies 14 adjacent to each other and the ceiling portion 20 of the case 12.

The lower reinforcing member 52 extends along the axial direction of the container main body 14, and in this embodiment, the lower reinforcing member 52 extends with a longitudinal direction thereof being in the vehicle width direction. The lower reinforcing member 52 is formed such that a cross section as viewed in the vehicle width direction has a substantially triangular shape, and is configured to include a lower surface portion 52A and a pair of side surface portions 52B.

The lower surface portion 52A is fixed to the bottom portion 24 of the case 12 in a state of being superimposed on the bottom portion 24. The side surface portions 52B obliquely extend from both end portions of the lower surface portion 52A toward the vehicle upper side, and the tips thereof are connected to form an apex of a triangle.

On the other hand, the upper reinforcing member 54 extends substantially parallel to the lower reinforcing member 52 along the axial direction of the container main body 14. The upper reinforcing member 54 is provided at a position corresponding to the lower reinforcing member 52, and is formed such that a cross section as viewed in the vehicle width direction has a substantially triangular shape.

The upper reinforcing member 54 is configured to include an upper surface portion 54A and a pair of side surface portions 54B, and the upper surface portion 54A is fixed to the ceiling portion 20 of the case 12 in a state of being superimposed on the ceiling portion 20. The side surface portions 54B obliquely extend from both end portions of the upper surface portion 54A toward the vehicle lower side, and the tips thereof are connected to form an apex of a triangle.

The lower reinforcing member 52 and the upper reinforcing member 54 are connected up and down by a connecting member 56. The connecting member 56 is formed of a flat plate-like member in which a thickness direction thereof is in the front-rear direction of the vehicle, and in this embodiment, the connecting member 56 extends in the vehicle width direction together with the lower reinforcing member 52 and the upper reinforcing member 54. A lower end portion of the connecting member 56 is joined to an upper end portion of the lower reinforcing member 52, and an upper end portion of the connecting member 56 is joined to a lower end portion of the upper reinforcing member 54.

Although not shown, each of the lower reinforcing member 52 and the upper reinforcing member 54 has one end portion fixed to the right wall 22B of the peripheral wall portion 22 of the case 12 and the other end portion fixed to the left wall 22C, similarly to the lower reinforcing member 18 of the first embodiment (refer to FIG. 2).

Operation

Next, an operation of this embodiment will be described.

In the high-pressure container unit 50 according to this embodiment, both the lower reinforcing member 52 and the upper reinforcing member 54 are provided, and therefore, the collision resistance performance can be further improved compared to a structure in which only one of the lower reinforcing member 52 and the upper reinforcing member 54 is provided.

Both the space surrounded by the container main bodies 14 adjacent to each other and the bottom portion 24 and the space surrounded by the container main bodies 14 adjacent to each other and the ceiling portion 20 are dead spaces, and therefore, even in a case where the lower reinforcing member 52 and the upper reinforcing member 54 are disposed in these spaces, it is not necessary to reduce the capacity of the container main body 14.

In this embodiment, the lower reinforcing member 52 and the upper reinforcing member 54 are connected up and down by the connecting member 56, and therefore, in a case where a collision load is input, the collision load can be dispersed between the lower reinforcing member 52 and the upper reinforcing member 54. As a result, the collision resistance performance can be improved compared to a structure in which the connecting member 56 is not provided.

The embodiments have been described above. However, of course, various aspects can be made within a scope that does not depart from the gist of this disclosure. For example, in the first embodiment described above, the cross section of the lower reinforcing member 18 is made to be a substantially trapezoidal shape, and in the second embodiment described above, the cross section of the lower reinforcing member 52 is made to be a substantially triangular shape. However, there is no limitation thereto. That is, the lower reinforcing member 52 of the second embodiment may be formed to have a substantially trapezoidal cross section. Similarly, the upper reinforcing member 54 may be formed to have a substantially trapezoidal cross section.

In the embodiments described above, as shown in FIG. 2, the left end portion of the container main body 14 is fixed to the case 12. However, there is no limitation thereto. For example, a configuration may be made in which the left end portion of the container main body 14 is supported by a bracket or the like provided on the bottom portion 24, so that a gap is provided between the left end portion of the container main body 14 and the case 12. In this case, a structure is made in which both end portions in the axial direction of the container main body 14 are separated from the peripheral wall portion 22 of the case 12, and therefore, at the time of a collision such as a side collision, before a collision load is input to the container main body 14, the collision load can be reliably received by the reinforcing member.

In the embodiments described above, the container main body is mounted on the vehicle such that the axial direction of the container main body 14 is in the vehicle width direction. However, there is no limitation thereto. For example, the container main body may be mounted on the vehicle such that the axial direction of the container main body 14 is in the front-rear direction of the vehicle. A two-stage structure may be made in which a plurality of container main bodies 14 is arranged with the axial direction thereof being in the front-rear direction of the vehicle on the container main bodies 14 arranged with the axial direction thereof being in the vehicle width direction.

What is claimed is:

1. A high-pressure container unit, comprising:
   a box-shaped case mounted on a vehicle, and including a bottom portion, a ceiling portion, and a peripheral wall portion;
   a plurality of container main bodies arranged in an interior of the box-shaped case, and each of the plurality of container main bodies having a cylindrical body portion; and
   a reinforcing member extending along an axial direction of the plurality of container main bodies, wherein the reinforcing member is provided in at least one of
   a first space surrounded by adjacent container main bodies among the plurality of container main bodies and the bottom portion, or
   a second space surrounded by the adjacent container main bodies among the plurality of container main bodies and the ceiling portion, and
   a cross-section shape of the reinforcing member along a direction crossing the axial direction is a quadrilateral or triangular shape which has a lower surface portion fixed to the box-shaped case.

2. The high-pressure container unit according to claim 1, wherein
   a gap is provided between at least one end portion of each of the plurality of container main bodies in the axial direction and the peripheral wall portion of the box-shaped case, and
   both end portions of the reinforcing member in the axial direction are fixed to the peripheral wall portion.

3. The high-pressure container unit according to claim 1, further comprising:
   a plurality of reinforcing members including the reinforcing member, wherein
   the plurality of reinforcing members includes
   a lower reinforcing member provided in the first space, and
   an upper reinforcing member provided in the second space.

4. The high-pressure container unit according to claim 3, further comprising a connecting member connecting the lower reinforcing member and the upper reinforcing member in a vertical direction.

5. The high-pressure container unit according to claim 1, wherein the reinforcing member extends in a vehicle width direction in a state of being mounted on the vehicle.

6. The high-pressure container unit according to claim 1, wherein
   the cross-section shape of the reinforcing member is quadrilateral, and further has
   an upper surface portion opposite to the lower surface portion, and
   a pair of side surface portions connecting the lower surface portion and the upper surface portion.

7. The high-pressure container unit according to claim 6, wherein
   the cross-section shape of the reinforcing member is a substantially trapezoidal shape.

8. The high-pressure container unit according to claim 6, wherein
   each of the pair of side surface portions of the reinforcing member is curved to correspond to, and is in contact with, a circumferential surface of a corresponding container main body of the plurality of container main bodies.

9. The high-pressure container unit according to claim 1, wherein
   the cross-section shape of the reinforcing member is triangular, and further has a pair of side surface portions extending obliquely from two end portions of the lower surface portion toward each other to form an apex.

10. The high-pressure container unit according to claim 1, wherein
    the reinforcing member is of metal.

11. A high-pressure container unit, comprising:
    a box-shaped case mounted on a vehicle, and including a bottom portion, a ceiling portion, and a peripheral wall portion;
    a plurality of container main bodies arranged in an interior of the box-shaped case and each of the plurality of container main bodies having a cylindrical body portion;
    a plurality of reinforcing members extending along an axial direction of the plurality of container main bodies, wherein the plurality of reinforcing members includes a lower reinforcing member provided in a first space surrounded by adjacent container main bodies among the plurality of container main bodies and the bottom portion, and an upper reinforcing member provided in a second space surrounded by the adjacent container main bodies among the plurality of container main bodies and the ceiling portion; and a connecting member connecting the lower reinforcing member and the upper reinforcing member, wherein the connecting member extends along the axial direction together with the lower reinforcing member and the upper reinforcing member, and a cross-section shape of the lower reinforcing member along a direction crossing the axial direction is triangular, and further has a lower surface portion fixed to the bottom portion of the box-shaped case, and a pair of side surface portions extending obliquely from two end portions of the lower surface portion toward each other to form an apex.

12. The high-pressure container unit according to claim 11, wherein a cross-section shape of the upper reinforcing member along the direction crossing the axial direction is triangular, and further has an upper surface portion fixed to the ceiling portion of the box-shaped case, and a pair of side surface portions extending obliquely from two end portions of the upper surface portion toward each other to form an apex.

13. The high-pressure container unit according to claim 12, further comprising a connecting member having a flat plate shape and connecting the apex of the lower reinforcing member and the apex of the upper reinforcing member.

14. The high-pressure container unit according to claim 11, wherein the reinforcing member is of metal.

15. A high-pressure container unit, comprising:

a box-shaped case mounted on a vehicle, and including a bottom portion, a ceiling portion, and a peripheral wall portion;

a plurality of container main bodies arranged in an interior of the box-shaped case, and each of the plurality of container main bodies having a cylindrical body portion; and a plurality of reinforcing members extending along an axial direction of the plurality of container main bodies, wherein the plurality of reinforcing members includes a lower reinforcing member provided in a first space surrounded by adjacent container main bodies among the plurality of container main bodies and the bottom portion, and an upper reinforcing member provided in a second space surrounded by the adjacent container main bodies among the plurality of container main bodies and the ceiling portion, wherein the plurality of reinforcing members has, along a direction crossing the axial direction, a hollow, closed cross-sectional shape, and a cross-section shape of the lower reinforcing member along the direction crossing the axial direction is a substantially trapezoidal shape, and further has a lower surface portion fixed to the bottom portion of the box-shaped case, an upper surface portion opposite to the lower surface portion, and a pair of side surface portions connecting the lower surface portion and the upper surface portion.

16. The high-pressure container unit according to claim 15, wherein a cross-section shape of the upper reinforcing member along the direction crossing the axial direction is a substantially trapezoidal shape, and further has an upper surface portion fixed to the ceiling portion of the box-shaped case, a lower surface portion opposite to the upper surface portion, and a pair of side surface portions connecting the lower surface portion and the upper surface portion.

17. The high-pressure container unit according to claim 15, wherein the reinforcing member is of metal.

* * * * *